(12) United States Patent
Richards et al.

(10) Patent No.: US 10,506,484 B2
(45) Date of Patent: Dec. 10, 2019

(54) METHOD AND APPARATUS FOR FACILITATING NETWORK COEXISTENCE

(71) Applicant: Telefonaktiebolaget LM Ericsson (publ), Stockholm (SE)

(72) Inventors: Christopher Richards, Ottawa (CA); Michael Petras, Nepean (CA); Alfred Schmidt, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 131 days.

(21) Appl. No.: 15/024,764

(22) PCT Filed: Mar. 18, 2016

(86) PCT No.: PCT/IB2016/051554
§ 371 (c)(1),
(2) Date: Mar. 24, 2016

(87) PCT Pub. No.: WO2016/151459
PCT Pub. Date: Sep. 29, 2016

(65) Prior Publication Data
US 2017/0041844 A1    Feb. 9, 2017

Related U.S. Application Data

(60) Provisional application No. 62/136,194, filed on Mar. 20, 2015.

(51) Int. Cl.
*H04W 36/14* (2009.01)
*H04W 48/18* (2009.01)
(Continued)

(52) U.S. Cl.
CPC .......... *H04W 36/14* (2013.01); *H04B 17/318* (2015.01); *H04H 20/38* (2013.01);
(Continued)

(58) Field of Classification Search
CPC ... H04W 28/08; H04W 48/20; H04W 40/244; H04W 16/14; H04W 72/06;
(Continued)

(56) References Cited

U.S. PATENT DOCUMENTS 9,084,081 B2 *   7/2015  Gupta ................... H04W 76/10
9,521,568 B2 *  12/2016  Liu ....................... H04W 24/08
(Continued)

FOREIGN PATENT DOCUMENTS

WO      2014110803 A1    7/2014
WO      2014148969 A1    9/2014
(Continued)

OTHER PUBLICATIONS

Pratik, Onkarpathak et al., "Wi_fi Indoor Positioning System Based on RSSI Measurements from Wi-Fi Access Points—A Tri-lateration Approach", International Journal of Scientific & engineering Research, vol. 5, Issue 4, Apr. 2014, 1234-1238.
(Continued)

*Primary Examiner* — Mehmood B. Khan
(74) *Attorney, Agent, or Firm* — Murphy, Bilak & Homiller, PLLC

(57) ABSTRACT

A method of sending information to a radio access node (RAN) of a first radio access technology (RAT) regarding one or more coexisting RAN's of a second RAT is provided. In particular, the information comprises a number of parameters and operating modes used by the one or more coexisting radio access nodes.

17 Claims, 17 Drawing Sheets

(51) Int. Cl.

| | |
|---|---|
| *H04W 48/20* | (2009.01) |
| *H04W 16/14* | (2009.01) |
| *H04B 17/318* | (2015.01) |
| *H04H 20/38* | (2008.01) |
| *H04W 40/24* | (2009.01) |
| *H04W 72/04* | (2009.01) |
| *H04W 72/06* | (2009.01) |
| *H04W 36/38* | (2009.01) |
| *H04W 64/00* | (2009.01) |
| *H04W 88/02* | (2009.01) |
| *H04W 88/18* | (2009.01) |
| *H04W 84/12* | (2009.01) |
| *H04W 88/08* | (2009.01) |

(52) U.S. Cl.
CPC ......... *H04W 16/14* (2013.01); *H04W 40/244* (2013.01); *H04W 48/18* (2013.01); *H04W 48/20* (2013.01); *H04W 72/0453* (2013.01); *H04W 72/06* (2013.01); *H04W 36/38* (2013.01); *H04W 36/385* (2013.01); *H04W 64/00* (2013.01); *H04W 84/12* (2013.01); *H04W 88/02* (2013.01); *H04W 88/08* (2013.01); *H04W 88/18* (2013.01)

(58) Field of Classification Search
CPC . H04W 72/0453; H04W 36/14; H04W 84/12; H04W 88/08; H04W 36/38; H04W 36/385; H04W 64/00; H04W 88/02; H04W 88/18; H04W 48/18; H04W 20/38; H04B 17/318
See application file for complete search history.

(56) References Cited

U.S. PATENT DOCUMENTS

| | | | | |
|---|---|---|---|---|
| 2004/0023640 | A1* | 2/2004 | Ballai | H04L 63/10 455/411 |
| 2007/0115899 | A1 | 5/2007 | Ovadia et al. | |
| 2008/0125161 | A1 | 5/2008 | Ergen et al. | |
| 2012/0108179 | A1 | 5/2012 | Kasslin et al. | |
| 2012/0281637 | A1 | 11/2012 | Junell | |
| 2013/0223308 | A1* | 8/2013 | Chandra | H04W 52/028 370/311 |
| 2013/0231132 | A1* | 9/2013 | Huang | G01S 5/02 455/456.1 |
| 2014/0029570 | A1 | 1/2014 | Lee et al. | |
| 2014/0079022 | A1 | 3/2014 | Wang et al. | |
| 2014/0233386 | A1 | 8/2014 | Jamadagni et al. | |
| 2014/0254412 | A1* | 9/2014 | Siomina | H04W 24/02 370/252 |
| 2014/0293959 | A1 | 10/2014 | Singh et al. | |
| 2014/0328254 | A1 | 11/2014 | Lim | |
| 2014/0334446 | A1* | 11/2014 | Lim | H04W 28/08 370/331 |
| 2014/0341076 | A1* | 11/2014 | Orlandi | H04W 48/18 370/254 |
| 2014/0378157 | A1 | 12/2014 | Wei et al. | |
| 2015/0215832 | A1* | 7/2015 | Fitzpatrick | H04W 48/18 455/426.1 |
| 2015/0327282 | A1* | 11/2015 | Werner | H04W 72/085 455/450 |
| 2015/0351017 | A1* | 12/2015 | Wirola | H04W 4/02 370/338 |
| 2015/0365805 | A1* | 12/2015 | Bajko | G01S 13/767 455/456.1 |
| 2015/0382282 | A1* | 12/2015 | Siddam | H04W 48/04 370/338 |
| 2016/0373944 | A1* | 12/2016 | Jain | H04L 43/50 |
| 2017/0181077 | A1* | 6/2017 | Jung | H04W 48/20 |
| 2017/0264606 | A1* | 9/2017 | Forssell | H04L 63/0815 |
| 2017/0289950 | A1* | 10/2017 | Chang | H04W 64/003 |

FOREIGN PATENT DOCUMENTS

| | | |
|---|---|---|
| WO | 2015002466 A2 | 1/2015 |
| WO | 2015016138 A1 | 2/2015 |
| WO | 2015187565 A1 | 12/2015 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 2013, 1-349.

ETSI, "LTE; Evolved Universal Terrestrial Radio Access (E-UTRA); Radio Resource Control (RRC); Protocol specification (3GPP TS 36.331 version 12.4.1 Release 12)", ETSI TS 136 331 V12.4.1, Feb. 2015, 1-415.

Unknown, Author, "LTE LIcense Assisted Access", Ericsson, Jan. 2015, 1-18.

Unknown, Author, "Wi-Fi measurements For LTE-U", Qualcomm / Ericsson, Mar. 9, 2015, 1-6.

\* cited by examiner

| SupportedStandard | Enumerated List | e.g., {11a, 11n, 11ac-w1, 11ac-w2} |
|---|---|---|
| HotSpotIndicator | Boolean | |
| InfrastructureMode | Boolean | |
| BeaconDataRate | Integer | |
| BeaconDuration | Integer | |
| BeaconRSSI | Integer | e.g., (-128, ..., 127) |
| TransmitPower | Integer | e.g., (-128, ..., 127) |
| KnownSSIDtoUE | Boolean | |
| UECertificateAssociatedwith SSID | Boolean | |
| SSIDSecurity | Enumerated List | e.g., {Open, WEP, WPA, WPA2} |

METHOD AND APPARATUS FOR FACILITATING NETWORK COEXISTENCE

TECHNICAL FIELD

The present invention generally relates to wireless communication networks, and particularly relates to the coexistence of wireless communication networks.

BACKGROUND

With spectrum remaining a scarce communication resource, different types of communication networks increasingly operate in and compete for usage of the same or overlapping spectrum. Consider, for example, the case of using "license assisted access" or LAA in the context of Wireless Wide Area Networks or WWANs that are based on the Long Term Evolution, LTE, specifications promulgated by the Third Generation Partnership Project, 3GPP.

LTE with LAA aggregates carriers in the licensed spectrum with carriers in shared or unlicensed spectrum—e.g., the LTE network serves a given wireless communication device using a primary carrier in licensed spectrum and a secondary carrier in the 5 GHz unlicensed spectrum. This approach takes advantage of the presence of relatively large amounts of spectrum in the unlicensed spectrum (such as between 5.150 GHz and 5.350 GHz).

Note that the same approach can be applied to Licensed Shared Access (LSA) and Authorized Shared Access (ASA) spectrum. LSA and ASA are approaches whereby spectrum licensed to an incumbent wireless operator may also be used by other licensees or authorized users when not in use by the incumbent wireless operator.

FIG. 1 depicts an example arrangement, where a LTE network 6 serves a User Equipment, UE, 8 using a Carrier Aggregation, CA, configuration that aggregates a primary carrier in the network's licensed spectrum with a second carrier in shared or unlicensed spectrum. This approach allows the LTE network 6 to boost data speeds to the UE 8 and to better manage loading in the licensed spectrum. Usage of shared or unlicensed spectrum may be conditioned on need, such as in dependence on the communication service or services being used by the UE 8 and/or on the number of users, loading in the licensed spectrum, etc.

Of course, other types of networks or systems may be operating in the shared or unlicensed spectrum, and coexistence with these other networks represents a key aspect of fairly sharing the shared or unlicensed spectrum. Wireless Local Access Networks, WLANs, based on the IEEE 802.11 standards—popularly known as Wi-Fi networks—are significant users of unlicensed spectrum, although networks based on still other Radio Access Technologies, RATs, may operate in the shared or unlicensed spectrum of interest to the network operator.

In the particular example context of a LTE network sharing spectrum with one or more Wi-Fi networks, one might consider the LTE network as "fairly" sharing the same spectrum used by Wi-Fi if its usage of that spectrum does not affect Wi-Fi services in the involved coverage area(s) to any greater extent than they would be affected by adding an additional Wi-Fi network on the same carrier.

Regardless of how one measures "fair" use, it will be appreciated that a licensed network should "coexist" as well as possible with any networks operating in the same shared or unlicensed spectrum targeted by the licensed network for supplementing its licensed spectrum. Various coexistence mechanisms are known, but they can be broadly understood as controlling channel selection and channel usage. For example, a base station in a licensed network may activate and use secondary carriers in a shared or unlicensed spectrum based on finding the "cleanest" channel or channels in the shared or unlicensed spectrum.

The base station might, for example, perform a series of interference measurements in the frequencies corresponding to the set of channels within all or a portion of the shared or unlicensed spectrum. It also may be required for the network to perform a Listen-Before-Talk, LBT, operation before transmitting on a channel in the shared or unlicensed spectrum.

To some extent, the UEs or other wireless devices being supported by the wireless network may provide helpful information to the network, e.g., by providing inter-RAT measurements to the network. For example, it is known to have LTE UEs provide at least a limited set of Wi-Fi related measurements to the LTE network, to improve the coexistence mechanisms of the LTE network. For example, certain Wi-Fi Access Points, APs, may be visible to nearby UEs, but not visible to or otherwise detectable by the LTE base stations serving the UEs.

Broadly, many challenges remain with respect to improving these coexistence mechanisms, as the use of shared or unlicensed spectrum becomes more prevalent.

SUMMARY

In order to develop superior channel selection and coexistence algorithms, a method of sending information to a radio access node (RAN) of a first radio access technology (RAT) regarding one or more coexisting RAN's of a second RAT is provided. In particular, the information comprises a number of parameters and operating modes used by the one or more coexisting radio access nodes.

The presently disclosed embodiments include several methods as might be implemented in a network node or a wireless device. For example, one example embodiment is a method implemented by a network node configured for operation in a wireless communication network that at least conditionally uses spectrum associated with Wireless Local Area Network, WLAN use. This method includes the step of receiving signaling conveying an identifier of a Wireless Local Area Network Access Point (WLAN AP) operating in the spectrum, and further includes the step of performing any one or more of: determining a preference between serving the wireless device via the wireless communication network or via the WLAN AP, at least in part based on the identifier of the WLAN AP; performing channel ranking or channel selection with respect to use of the spectrum by the wireless communication network, at least in part based on the identifier of the WLAN AP; and performing a positioning operation with respect to one or more of the wireless device, a base station in the wireless communication network, or the WLAN AP, at least in part based on the identifier of the WLAN AP.

Other embodiments include a complementary method, as implemented in a wireless device configured for operation in a wireless communication network that at least conditionally uses spectrum associated with WLAN use. This complementary method comprises obtaining an identifier of the WLAN AP, based on receiving broadcasts or other signaling from the WLAN AP, and further includes generating a reporting message that conveys the identifier of the WLAN AP. This method further includes sending the reporting message to the network.

Other embodiments include another method for implementation in a network node configured for operation in a wireless communication network that at least conditionally uses spectrum associated with WLAN use. This, this method includes the step of receiving signaling conveying one or more parameters of a WLAN AP operating in the spectrum, and further comprises the step of performing any one or more of a radio-access technology (RAT) steering operation, a positioning operation, a channel ranking operation for the spectrum, and a channel usage determination for the spectrum, based on at least one of the received parameters. At least one of the received parameters comprises one or more of: an indicator of the version or versions of Wi-Fi used or supported by the WLAN AP; an indicator of whether the WLAN AP is a hotspot AP; an indicator of whether the WLAN AP is an infrastructure AP; an indicator or indicators of Wi-Fi beacon duration and/or data rate for the WLAN AP; an indicator of the Received Signal Strength of the Wi-Fi beacon from the WLAN AP, as measured by a wireless device reporting the one or more parameters; an indicator of transmission power of the WLAN AP; an indicator of whether the WLAN AP is known to the reporting wireless device; an indicator of whether the reporting wireless device has a certificate for the WLAN AP; an indicator or indicators of an organizational affiliation of the WLAN AP; and an indicator of an identifier of the WLAN AP, such as any one or more of the SSID, BSSID or HESSID of the WLAN AP.

Still other embodiments include another method for implementation in a wireless device configured for operation in a wireless communication network that at least conditionally uses spectrum associated with WLAN use. This method comprises receiving broadcasts or other signaling from a WLAN AP operating in the spectrum, and further comprises reporting any one or more of the following parameters to the wireless communication network: an indicator of the version or versions of Wi-Fi used or supported by the WLAN AP; an indicator of whether the WLAN AP is a hotspot AP; an indicator of whether the WLAN AP is an infrastructure AP; an indicator or indicators of Wi-Fi beacon duration and/or data rate for the WLAN AP; an indicator of the Received Signal Strength of the Wi-Fi beacon from the WLAN AP, as measured by the wireless device; an indicator of transmission power of the WLAN AP; an indicator of whether the WLAN AP is known to the wireless device; an indicator of whether the reporting wireless device has a certificate for the WLAN AP; an indicator or indicators of an organizational affiliation of the WLAN AP; and an indicator of an identifier of the WLAN AP, such as any one or more of the SSID, BSSID or HESSID of the WLAN AP.

Yet other embodiments disclosed herein include network node apparatuses and wireless device apparatuses that correspond to the methods summarized above, and variations thereof, as well as corresponding computer program products.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 4 is a table of one embodiment of the Wi-Fi parameters that are advantageously reported to a wireless communication network, according to the teachings herein.

FIGS. 5A-5C depict a table of example uses made by a wireless communication network, of the various reported Wi-Fi parameters seen in the Table of FIG. 4.

DETAILED DESCRIPTION

Figure 1:
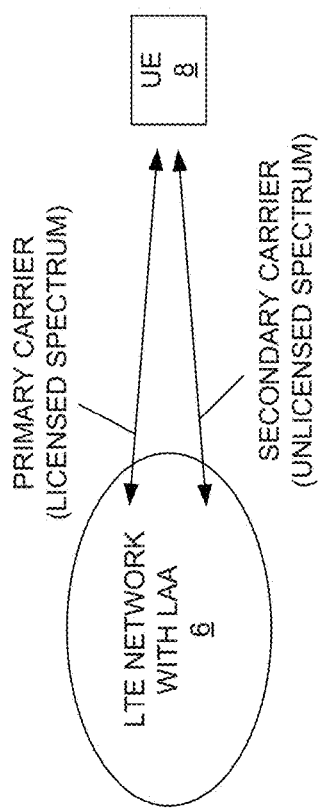
FIG. 1 is a block diagram of an example arrangement for using License Assisted Access, LAA, in a Long Term Evolution, LTE, network.
Figure 2:
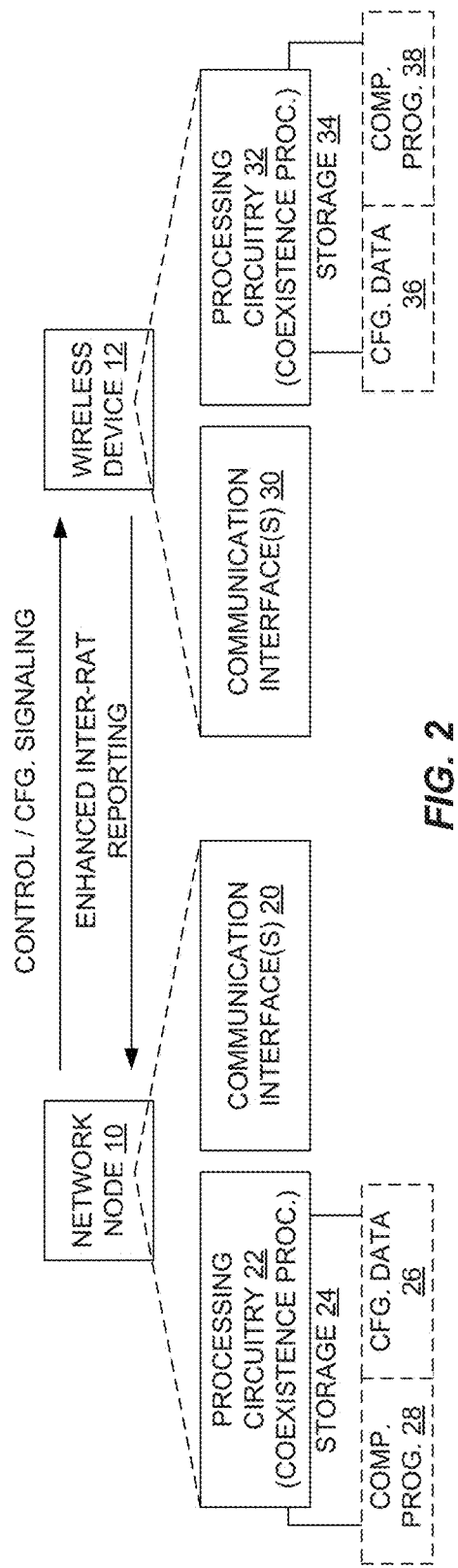
FIG. 2 is a block diagram of example embodiments of a network node and a wireless communication device, configured according to the teachings herein.

FIG. 2 illustrates a network node 10 and a wireless device 12. While FIG. 2 does not explicitly illustrate the associated communication network, it will be understood that the network node 10 operates within a communication network configured to provide communication services to the wireless device 12. By way of non-limiting example, the network node 10 is a base station or other network entity, such as a LTE eNB or a centralized controller associated with one or more eNBs. Correspondingly, in the same example context, the wireless device 12 comprises a LTE-based User Equipment, or UE, in the parlance of the Third Generation Partnership Project.

Of course, these are non-limiting examples, and it will be appreciated that the wireless device 12 may comprise essentially any type of communication equipment or apparatus that is configured to operate according to the Radio Access Technology, RAT, associated with the involved communication network. By way of example, the wireless device 12 may be a cellular radiotelephone—smartphone or feature phone—or may be a tablet, laptop or other computing device configured with a wireless transceiver. Alternatively, the wireless device 12 may be an embedded device, such as a modem, dongle or other network adaptor, and/or may comprise or be part of an apparatus configured for Machine Type Communication, MTC, in a Machine-to-Machine, M2M, context.

According some of the specific embodiments described herein, the first technology is LTE and the second technology is Wi-Fi. Furthermore, the radio access node of the first technology is an eNB and the one or more coexisting radio access nodes of the second radio access technology radio are Wi-Fi APs. Based on the information, the eNB may determine what Wi-Fi APs are within its LAA-LTE coverage area. In a further embodiment, the eNB may determine a number of parameters and operating modes that one or more Wi-Fi APs are using. It will be appreciated, however, that the techniques and apparatus are not limited to these contexts— the first technology may be a wireless communications technology other than LTE, in some embodiments, and/or the second technology may be a wireless LAN technology other than Wi-Fi.

In any case, according to the teachings herein, the network node 10 and the wireless device 12 are advantageously configured to perform one or more network-side and device-side "coexistence" operations, respectively. Here, the phrase "coexistence operation" denotes an operation performed with respect to controlling or configuring the involved communication network to coexist with respect to one or more other networks. In a non-limiting but useful example, the network node 10 is part of a LTE network and it and the wireless device 12 perform one or more coexistence operations with respect to a Wi-Fi network.

More particularly, the network node 10 provides control and/or configuration signaling to the wireless device 12, and the wireless device 12 correspondingly provides enhanced "inter-RAT reporting" to the network node 10. Notably, here, the network node 10 and the wireless device 12 may communicate "directly" by operating as the respective protocol endpoints of the contemplated communications, but that should be understood as a non-limiting example. In other embodiments, the network node 10 communicates indirectly with the wireless device 12, such as by sending signaling to another node, which then forwards it along for delivery to the wireless device 12, or which generates corresponding signaling for the wireless device 12. Even when the network node 10 and the wireless device 12 communicate directly, such signaling may be carried over or through other nodes—e.g., if the network node 10 is a positioning node, it may communicate with the wireless device 12 via a network base station.

Correspondingly, in the example embodiment, the network node 10 includes one or more communication interfaces 20 and processing circuitry 22 that is operatively associated with the one or more communication interfaces. The processing circuitry 22 includes or is associated with storage 24, which in one or more embodiments stores configuration data 26 and/or one or more computer programs 28.

The storage 24 comprises one or more types of non-transitory computer-readable media, such as any one or more of FLASH, EEPROM, DRAM, SRAM, electromechanical hard disk, solid-state disk, etc. In at least one embodiment, the storage 24 comprises a mix of non-volatile storage and volatile storage, such as working memory for computations and program execution. In this regard, the term "non-transitory storage" does not necessarily mean permanent or unchanging storage, but does mean storage of at least some persistence and excludes merely propagating signals.

The processing circuitry 22 comprises, e.g., one or more digital processing circuits, such as one or more microprocessors, Digital Signal Processors or DSPs, Field Programmable Gate Arrays or FPGAs, Application Specific Integrated Circuits or ASICs, etc. The processing circuitry 22 comprises, in at least some embodiments, a complex set of circuits, such as one or more backplane processing systems with various line cards providing various processing.

The particular implementation of the processing circuitry 22 will depend on the nature and intended use of the network node 10. Indeed, the network node 10 may, in fact, comprise more than one node, and the associated processing and functionality may be distributed or other cooperatively shared across the nodes. In any case, for purposes of this discussion, it will be understood that the network node 10, however implemented, is advantageously configured to perform coexistence processing. In at least one embodiment, the processing circuitry 22 is configured to carry out the network-side teachings disclosed herein, based on the execution of computer program instructions included in the computer program 28, as stored in the storage 24.

The wireless device 12 in the example embodiment also includes one or more communication interfaces 30, and operatively associated processing circuitry 32 that includes or is associated with storage 34. The storage 34 comprises one or more types of computer-readable media and in at least some embodiments provides non-transitory storage for configuration data 36 and/or a computer program 38. The one or more communication interfaces 30 comprise, for example, a radiofrequency, RF, transceiver, or multiple transceivers, including one or more RF receivers and one or more RF transmitters.

In at least one example embodiment, the communication interface(s) 30 include a cellular radio transceiver configured for operation in a LTE network, and configured for making inter-RAT measurements, such as for making signal measurements in unlicensed spectrum used by a Wi-Fi network. Additionally, in at least some embodiments, the communication interface(s) 30 include Wi-Fi or other WLAN transceiver circuitry, at least some of which may be shared with the cellular radio transceiver. Put simply, the wireless device 12 in at least some embodiments includes a communication interface or interfaces that are adapted for operation with respect to cellular networks and Wi-Fi networks.

Further, in at least one embodiment, the processing circuitry 32 is configured to carry out the device-side teachings disclosed herein, based on the execution of computer program instructions included in the computer program 38, as stored in the storage 34.

Figure 3:
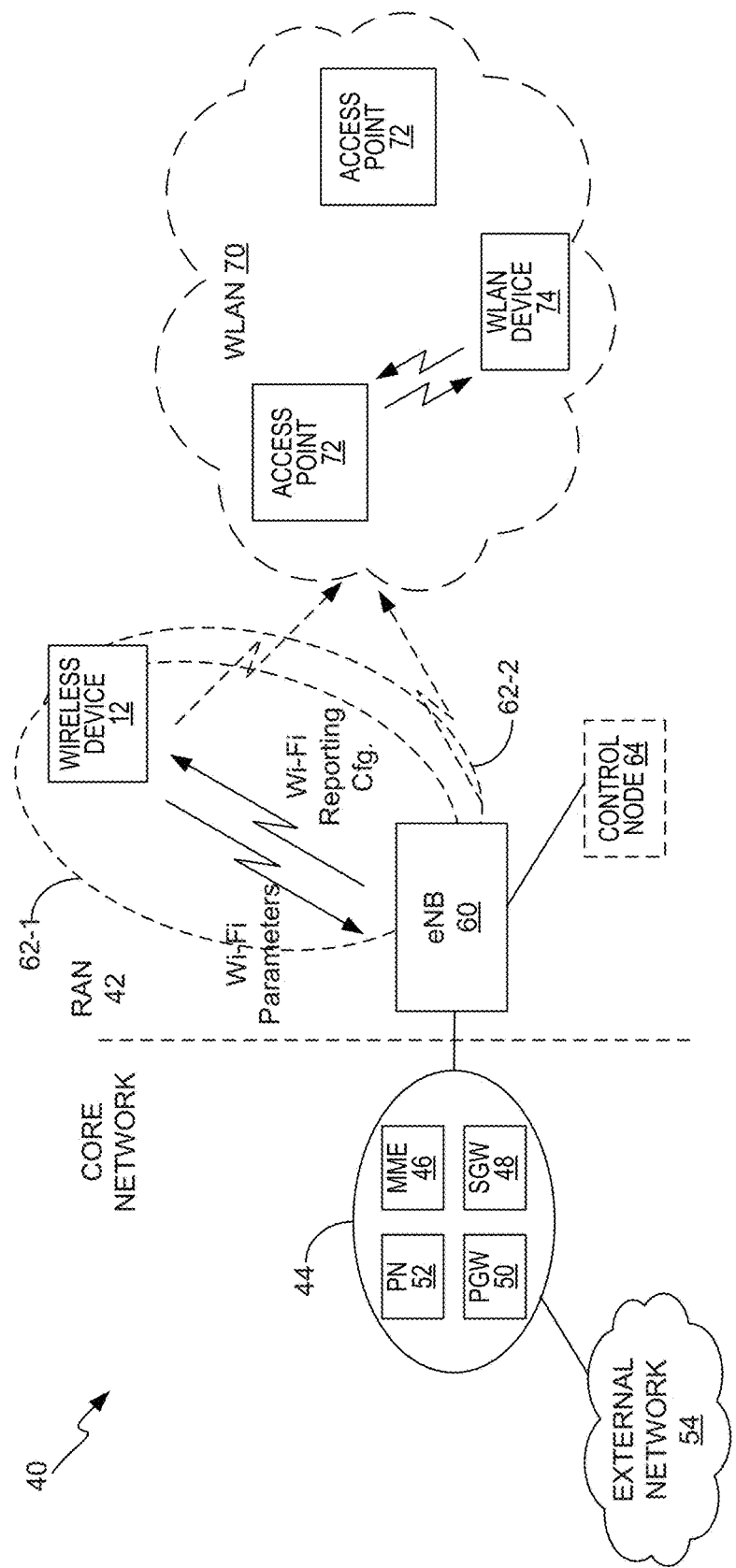
FIG. 3 is a block diagram of an example wireless communication network configured according to the teachings herein.

FIG. 3 illustrates an example wireless communication network 40. As a non-limiting example, the diagram adopts 3GPP terminology for Evolved Universal Terrestrial Radio Access Networks, E-UTRANs, and Evolved Packet Cores, EPCs. Thus, one sees that the network 40 includes a RAN portion 42, and a core network or CN portion 44. The CN portion 44 includes a number of nodes associated with providing communication services to wireless devices 12 served by the network 40.

In the simplified depiction, one sees a Mobility Management Entity, MME, 46, a Serving Gateway, S-GW, 48, a Packet Data Network Gateway, PGW, 50, and a Positioning Node, PN, 52. The CN portion 44 communicatively couples to one or more external networks 54, such as the Internet or other Packet Data Networks. Further, the RAN portion 42 includes one or more base stations 60, referred to as eNBs in the LTE vernacular. Only one eNB 60 is illustrated for ease of discussion, but potentially many eNBs 60 may be present in the network 40, with each providing one or more carriers or cells providing communication service within a corresponding coverage area.

For example, the depicted eNB 60 is configured for LTE operation with LAA, and thus is capable of providing cells or carriers in the licensed spectrum owned by the operator of the network 40, and one or more cells or carriers in unlicensed spectrum. By way of example, one sees a cell or carrier 62-1 and a cell or carrier 62-2. For ease of discussion, the cell or carrier 62-1 is referred to as a primary or licensed carrier 62-1, and the cell or carrier 62-2 is referred to a secondary or unlicensed carrier 62-2.

The secondary carrier 62-2 may be selectively activated and it will be understood that the eNB 60 may use more than one secondary carrier 62-2 in the unlicensed spectrum, e.g., for serving multiple wireless devices 12. Such usage can severely interfere with any nearby Wireless Local Access Networks, WLANs, 50. That is, co-channel usage by the LTE network 40 of the same spectrum used by the WLAN 70 can interfere significantly with the operation of WLAN access points, APs, 72 and/or WLAN devices 74 operating in the WLAN 70.

As an example, the WLAN 70 is a Wi-Fi network operating in the same unlicensed spectrum that is used by the network 40 for LAA. For purposes of this example, the eNB 60 operates as the aforementioned network node 10, or a control node 64 associated with the eNB 60—and, possibly, a number of other eNBs 60—operates as the aforementioned network node 10. In other words, in the example context of FIG. 3, the eNB 60 and/or the control node 64 perform the network-side coexistence operations at issue herein, in which the network 40 controls one or more aspects of its operation, to better coexist with and/or take advantage of the WLAN 70.

To that end, one sees that the eNB 60 may send signaling to the wireless device 12 that controls or configures the wireless device 12 in terms of the Wi-Fi parameters it reports and the related measurements its makes. In return, the eNB 60 receives corresponding Wi-Fi parameter reports from the wireless device 12, which are advantageously configured according to the teachings herein, in terms of their content and/or timing, etc.

FIG. 4 illustrates a table of advantageous Wi-Fi parameters, any one or more of which can be reported by the wireless device 12 to the eNB 60 and/or control node 64. The particular parameters to be reported and/or the triggering or timing of such reporting can be configured by the network 40, based on sending configuration signaling to the wireless device 12, or the wireless device 12 can be pre-configured to perform such reporting, or some combination of signaled and pre-configured reporting configurations may be used.

Any one or more of these advantageously reported parameters may be used by the network 40 to perform or control any one or more of channel ranking, channel usage, RAT steering, and positioning. The term "channel ranking" refers at least to those operations performed by the network 40 when deciding which channels in the unlicensed spectrum to use for secondary carriers, while the term "channel usage" refers to the determinations as to how much of the selected channel(s) to use—bandwidth and/or resource allocations. Finally, the term "RAT steering" refers to decision-making and corresponding signaling or control by the network 40, in terms of deciding whether it is preferable to serve a given wireless device 12 (or a given group of devices) via the network 40 to have the device(s) 12 get service from an available alternate RAT, such as Wi-Fi.

Figure 5A:
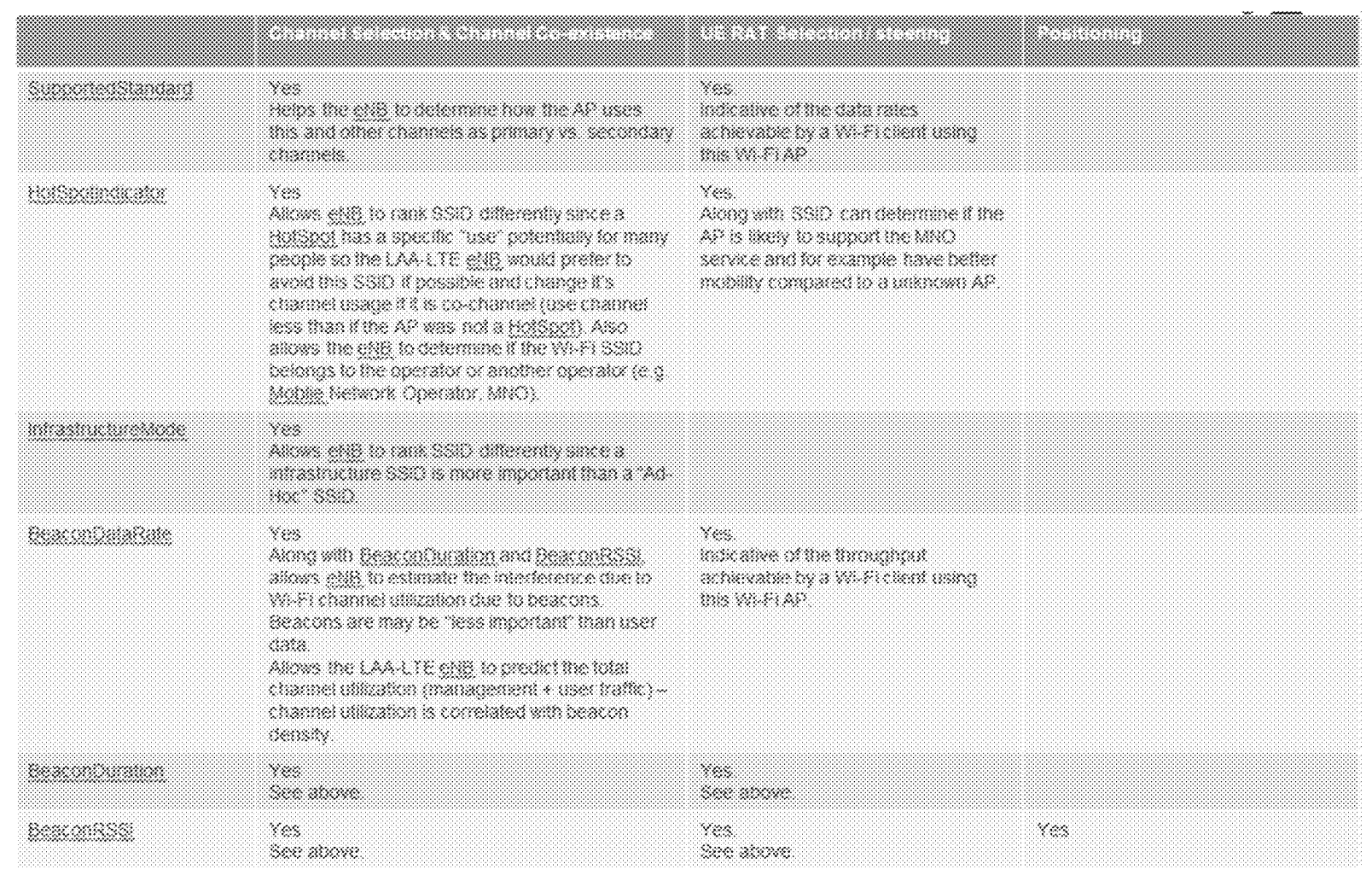
Figure 5B:
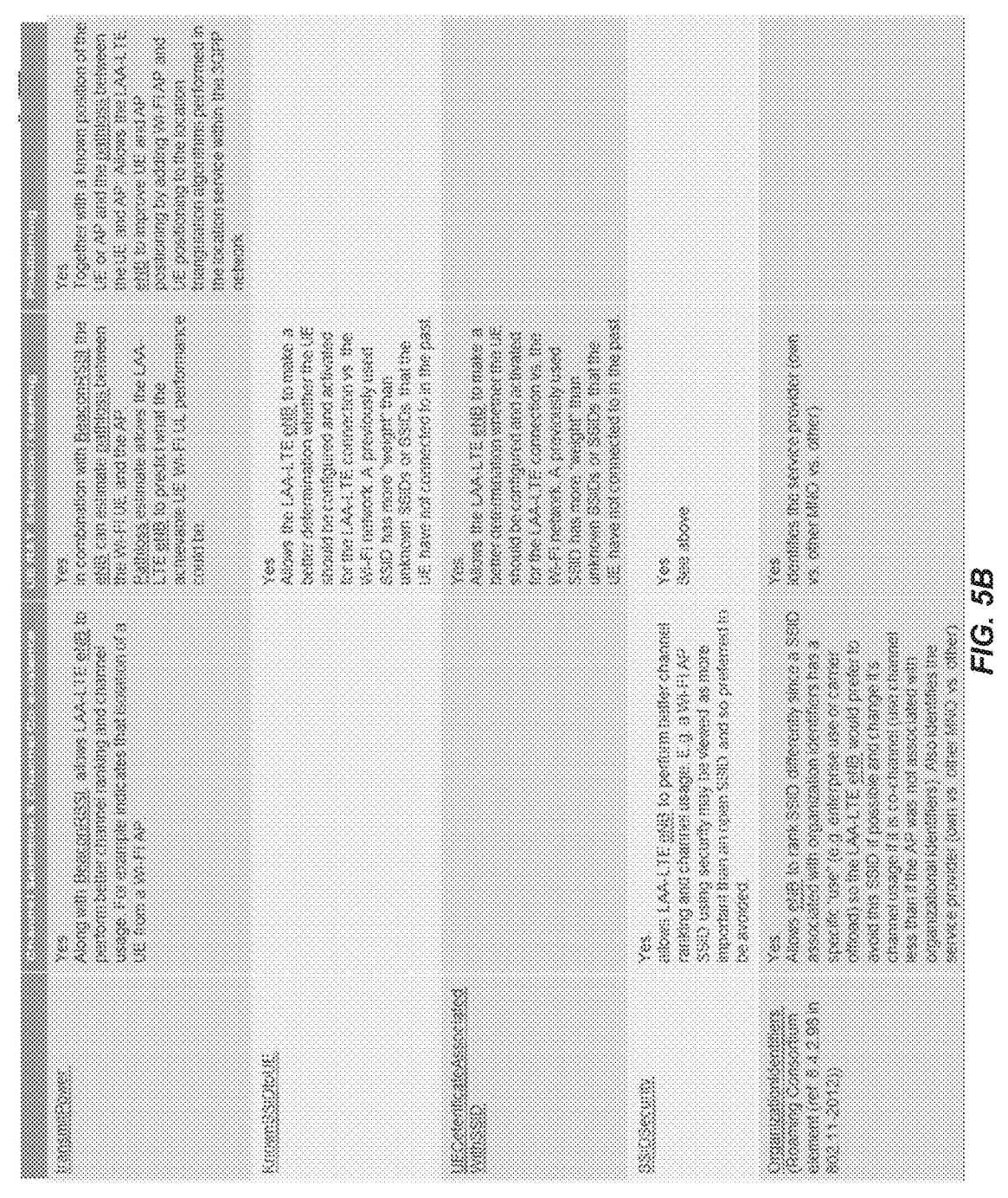
Figure 5C:
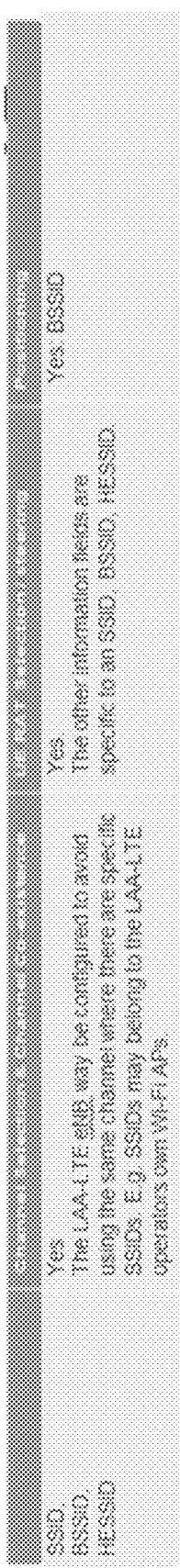

FIGS. 5A-5C will be understood as depicting a table of example uses contemplated herein for each of the parameters identified in the table of FIG. 4. In an example implementation, additional fields are added to a Wi-Fi Measurement Report signaling message to be added to a version of the 3GPP TS 36.331 standard.

Non-limiting example advantages afforded by the providing of these Wi-Fi parameters to the network include allowing an LTE eNB to have a much better view of the Wi-Fi environment of UEs connected to the eNB. The information may be used by the LTE LAA-LTE feature and may also be used in order to "map" the Wi-Fi environment in the coverage area of the eNB.

In one embodiment, the network 40 uses the information to avoid using spectrum associated with primary Wi-Fi channels, as opposed to spectrum associated with secondary Wi-Fi channels. In the same or another embodiment, the network 40 uses the information to determine Wi-Fi channel loading or occupancy, based on determining how much of the signal on a given Wi-Fi channel represents beacon transmissions versus data transmissions.

Further, in the same or other embodiments, the network 40 can perform additional, second- or higher-order channel ranking, such as: (1) avoid co-channel with other operator LTE-U nodes, (2) avoid Wi-Fi beacons (MAC addr), (3) avoid "special" Wi-Fi SSIDs, (4) avoid hotspot or enterprise Wi-Fi APs, and/or (5) configure special SSIDs or BSSID ranges to be avoided, e.g. list (regex) of operators own SSIDs, e.g., Telcoaname_WiFi_* or MAC addr 00:00:3D:*:*:* . . . .

Figure 6:
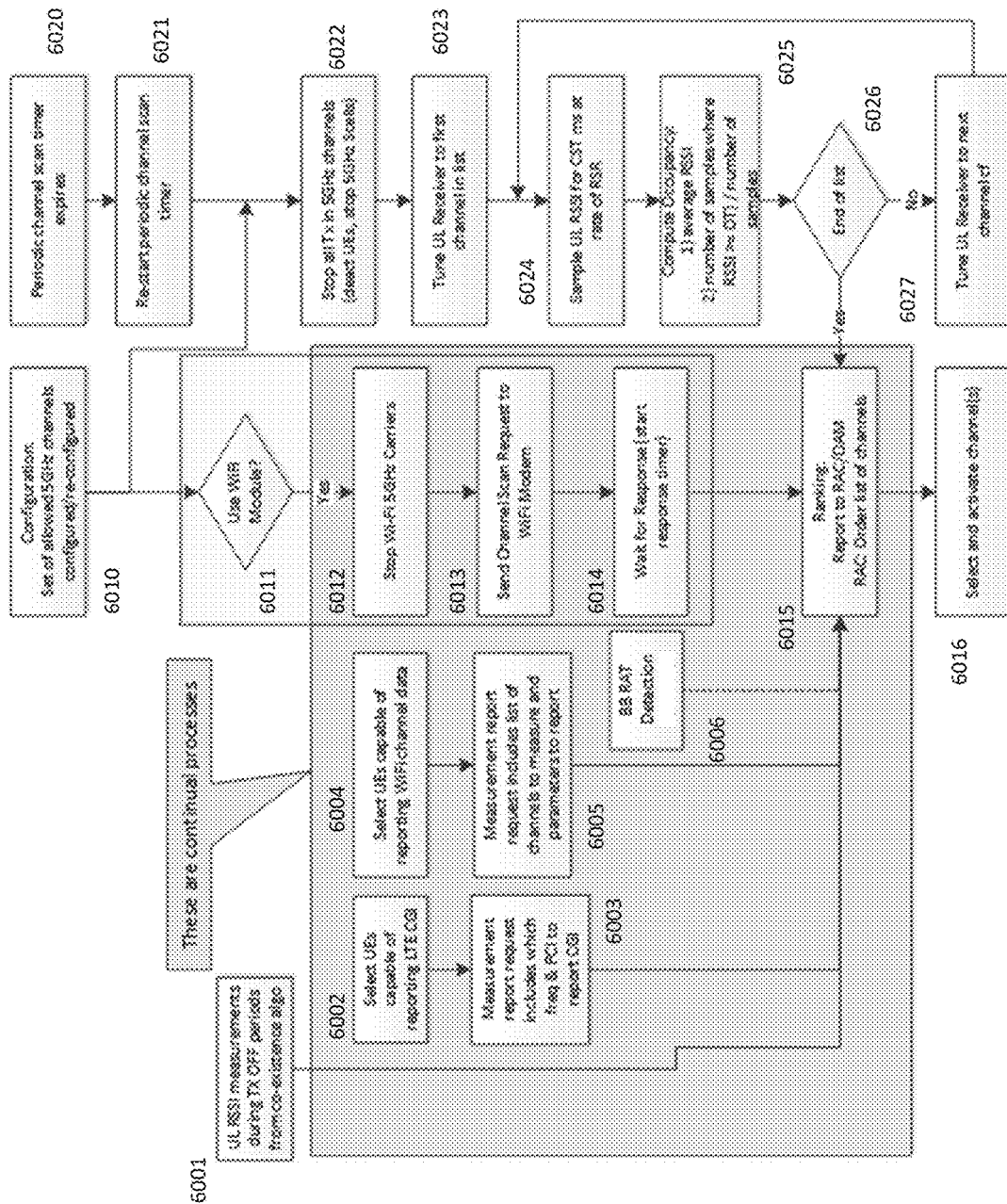
FIG. 6 is a logic flow diagram of one embodiment of a method of coexistence processing, e.g., channel ranking, selection and/or activation, for unlicensed or LSA or ASA spectrum, based on evaluating one or more of the parameters seen in the Table of FIG. 4.

FIG. 6 illustrates one embodiment of a method or methods of processing, as contemplated herein, for coexistence processing, such as may be performed by the aforementioned network node 10, for channel selection and activation by the network 40 in the unlicensed spectrum. The following acronyms not previously defined are used in FIG. 6: RAC (Radio Control), BB (Baseband), PCI (Physical Cell Identity), CGI (Cell Global Identity), OT (Occupancy Threshold), OAM (Operation and Maintenance), RSSI (Received Signal Strength Indication).

In particular, the figure illustrates that one or more wireless devices capable of reporting Wi-Fi channel data are selected, as shown at block 6004. From the selected one or more wireless devices, a measurement report request that includes a list of channels to measure and parameters is obtained, as shown at block 6005. The measurement report thus obtained is used in a channel ranking process, as shown at block 6015. Channels are further selected and activated based on the ranking, as block 6016. Alternatively to using the measurement report in the channel ranking process or in combination with this process, the measurement report may be used in a channel co-existence process (not shown) and/or a positioning process (not shown).

Several illustrated processes, including the use of a Wi-Fi module (or Wi-Fi "sniffer"), as shown at blocks 6011, 6012, 6013, and 6014, are optional. A process for determining occupancy metrics for channels in the unlicensed or shared band is initiated, as shown at blocks 6021 and 6022, by the expiration and re-starting of a periodic channel-scan timer, and includes, as shown at blocks 6022-6027, stopping all transmissions in the unlicensed or shared band (here, indicated as 5 GHz channels), and then, for each of several channels in the band: tuning an uplink receiver to the channel; sampling the uplink received signal strength indicator (RSSI) a plurality of times, at a given rate; and computing an occupancy level for the channel, based on the average RSSI or based on the number of samples where the RSSI exceeds an occupancy threshold (OT). The resulting information is fed to the ranking process shown at block 6015.

Other processes shown in FIG. 6 include the selection of UEs capable of reporting LTE CGI, as shown at block 6002, followed by the sending of a measurement report request to the selected UEs, as shown at block 6003, where the measurement report request includes which frequencies and/or PCI for which to report CGI. Again, the information so obtained is fed to the ranking process shown at block 615. Information from a radio-access technology (RAT) detection process, as shown at block 6006, may also be supplied to the ranking process shown in block 615.

Figure 7:
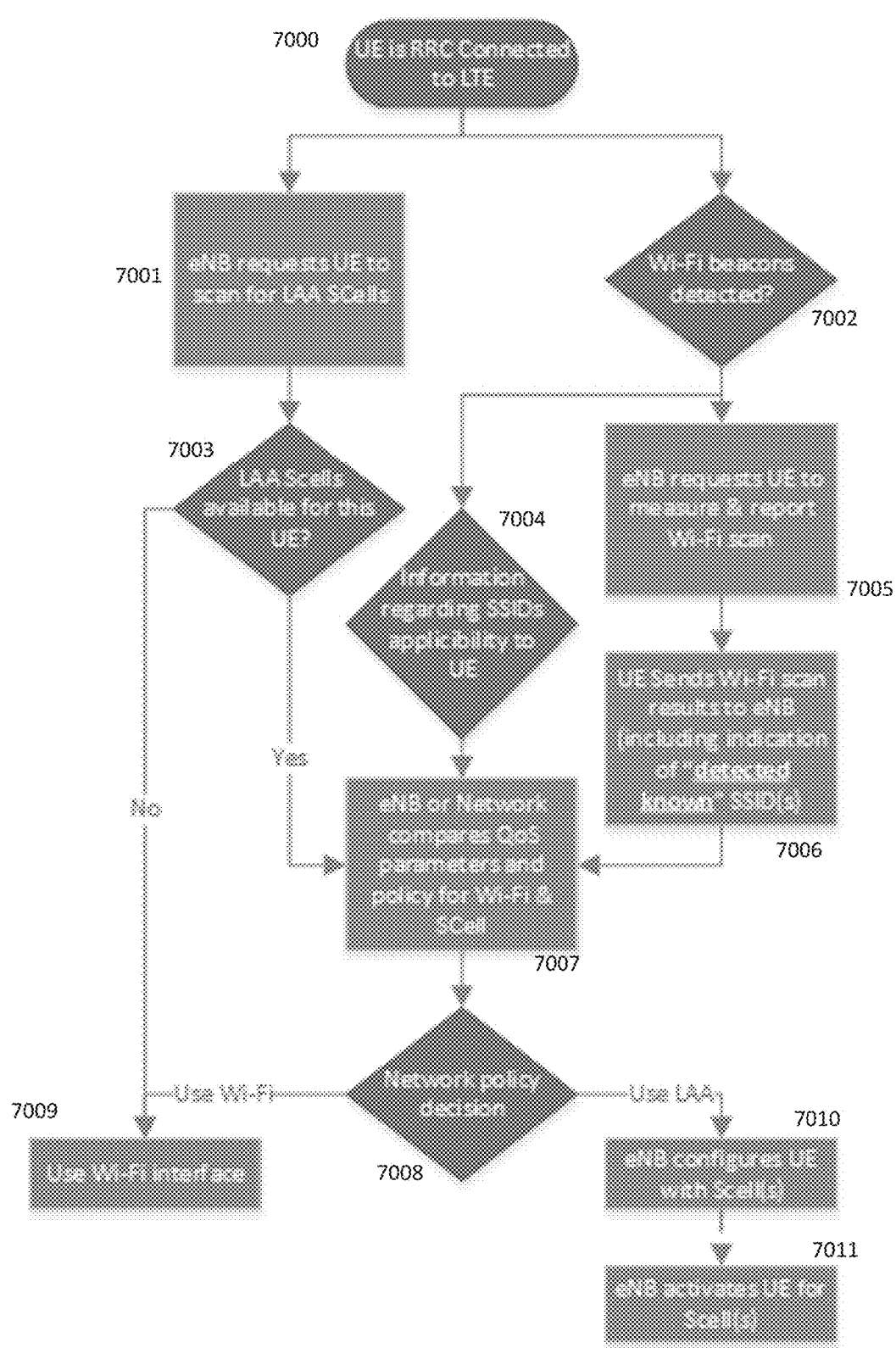
FIG. 7 is a logic flow diagram of one embodiment of a method of RAT steering, based on evaluating one or more of the parameters seen in the Table of FIG. 4.

FIG. 7 illustrates one embodiment of a method of RAT steering, such as may be performed, at least in part, by the aforementioned network node 10 with respect to a given UE or other wireless device 12. In this process, it is assumed that a UE is RRC-connected to an LTE network, as shown at block 7001. As shown at block 7001, the eNB requests the UE to scan for LAA SCells. If no LAA SCells are available for the UE, as shown at block 7003, then the eNB uses the Wi-Fi interface, as shown at block 7009. If LAA Scells are available, then the eNB or the network compares quality-of-service (QoS) parameters and policy for Wi-Fi & SCell, as shown at block 7007, and then makes a network policy decision, as shown at block 7008, with the outcome of the policy decision being either to use the Wi-Fi interface, as shown at block 7009, or to configure the UE with one or more Scells and activating the UE for one or more Scells, as shown at blocks 7010 and 7011.

The illustrated method also includes, as shown at block 7002, the determination of whether Wi-Fi beacons are detected. If so, information regarding the SSIDs applicability to the UE is supplied to the network policy determination process, as shown at blocks 7004 and 7007. Further, the eNB requests the UE to measure and report the results of a Wi-Fi scan, as shown at block 7005. The UE sends the results of the Wi-Fi scan to the eNB, including an indication of detected known SSID(s), as shown at block 7006. This information is also used in the network policy decision process shown at block 7007.

Figure 12:
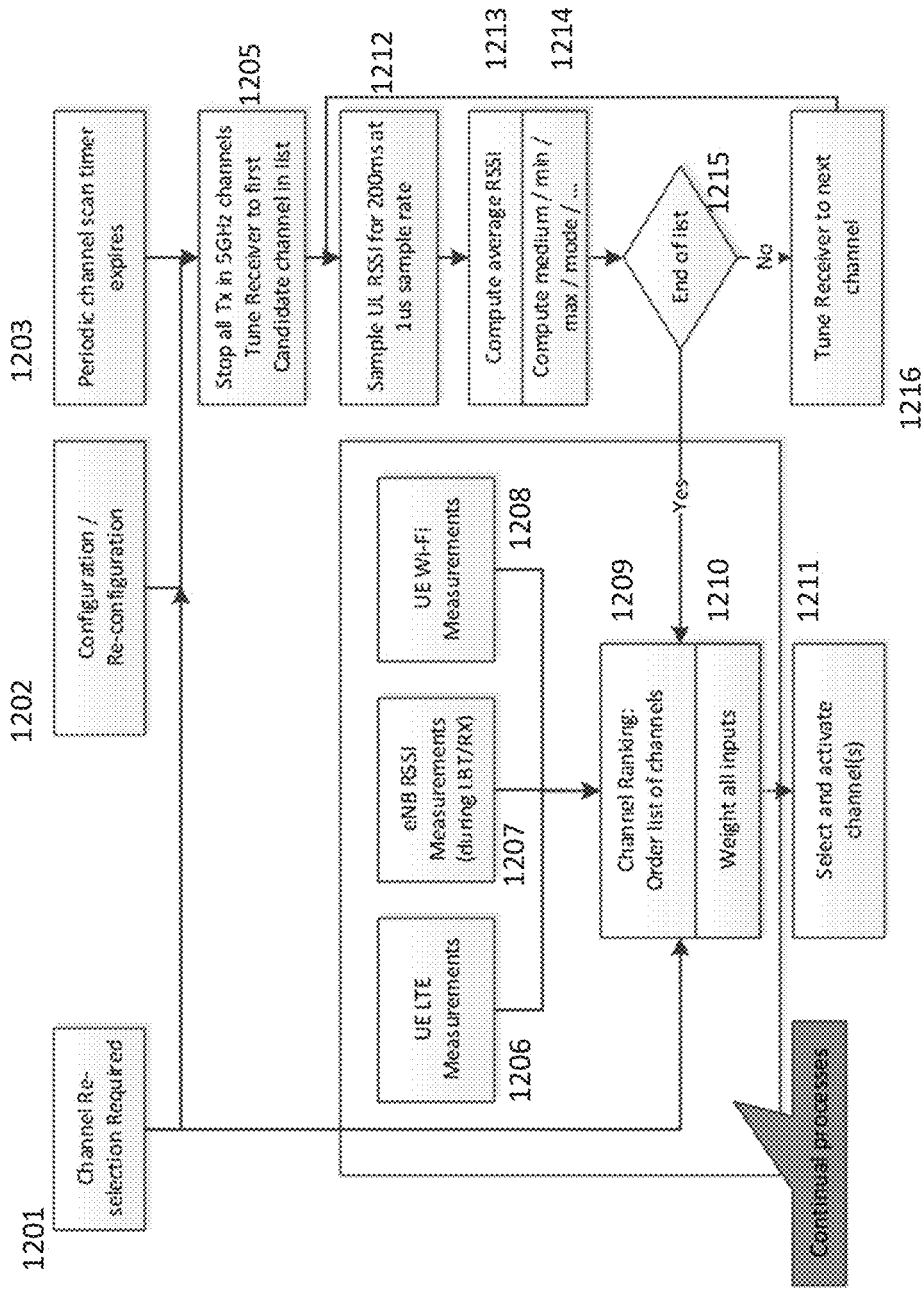
FIG. 12 is a logic flow diagram of another embodiment of a method of coexistence processing, e.g., channel ranking, selection and/or activation, for unlicensed or LSA or ASA spectrum, based on evaluating one or more of the parameters seen in the Table of FIG. 4.

FIG. 12 illustrates another embodiment of a method or methods for coexistence processing, again based on the parameters illustrated in FIG. 4. As seen in the figure, the process may be triggered by a determination that a channel re-selection is required, as shown at block 1201, which in turn triggers a channel ranking (block 1209), a weighting of all inputs (block 1210), and a selection and activation of channels (block 1211). Inputs to the channel ranking process include UE LTE measurements (block 1206), eNB RSSI measurements (e.g., measurements made during listen-before-talk (LBT) or during receive (RX) intervals (1207), and UE Wi-Fi measurements (1208).

As also seen in the figure, configuration or re-configuration (block 1202) or the expiry of a periodic channel scan timer (block 1203) may trigger a channel scanning procedure, which is shown in blocks 1205, 1221, 1212, 1213, 1214, 1215, and 1216. The results of the channel scanning procedure are fed to the channel ranking procedure as well. The channel scanning procedure includes, as stopping all transmissions in the unlicensed or shared band (here, indicated as 5 GHz channels), and then, for each of several channels in the band: tuning an uplink receiver to the channel (block 1205); sampling the uplink received signal strength indicator (RSSI) a plurality of times, at a given rate (block 1212); computing an average RSSI (block 1213); and computing an occupancy statistic for the channel, such as a median, minimum, maximum, mode, etc. (block 1214). The resulting information is fed to the ranking process shown at block 6015.

In further specific but non-limiting examples, the wireless device 12 is configured to report whether it sees any SSIDs that are known to it—e.g., based on previously connecting to the corresponding Wi-Fi network—and the network node 10 is configured to use that reported information for RAT steering, for example. In one such implementation, the network node 10 decides that the wireless device 12 should disconnect from the network 40—at least for a given communication service—and connect to the Wi-Fi network 70 for that service, if the wireless device 12 reports that it already knows the SSID of the Wi-Fi network 70.

The same or greater preference for Wi-Fi service rather than service from network 40 may be applied in the case where the UE already has a security certificate for the Wi-Fi network 70, where the Wi-Fi network 70 comprises a hotspot, etc. Of course, rather than using these parameters a yes/no decision variables, they can be used to set or adjust the value of one or more weighting factors, to bias the RAT steering decision towards Wi-Fi service.

Further, the network 40 makes better or more accurate calculations of which parts and/or how much of the unlicensed spectrum to use at any given time, based on knowing from the reporting Wi-Fi parameters detailed Wi-Fi information like the beacon particulars—rate and duration—and the particular Wi-Fi "flavor" or standard being used—e.g., 802.11a, 802.11n, etc.

Figure 8:
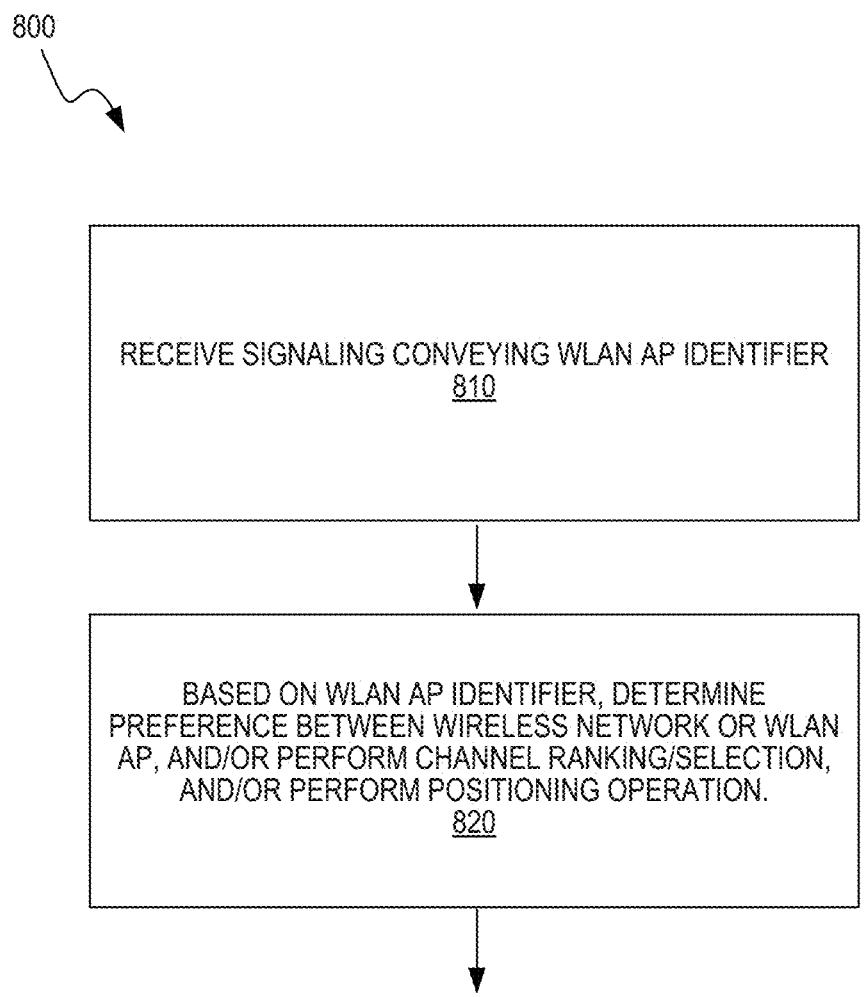
FIG. 8 is a process flow diagram illustrating an example method in a network node, according to the presently disclosed techniques.

In view of the techniques and specific examples described above, it will be appreciated that FIGS. 8-11 illustrate several generalized methods as might be implemented in a network node or a wireless device. FIG. 8, for example, illustrates a method 800 implemented by a network node configured for operation in a wireless communication network that at least conditionally uses spectrum associated with Wireless Local Area Network, WLAN use. The method includes, as shown at block 810, receiving signaling conveying an identifier of a Wireless Local Area Network Access Point (WLAN AP) operating in the spectrum, and further includes, as shown at block 820, performing any one or more of: determining a preference between serving the wireless device via the wireless communication network or via the WLAN AP, at least in part based on the identifier of the WLAN AP; performing channel ranking or channel selection with respect to use of the spectrum by the wireless communication network, at least in part based on the identifier of the WLAN AP; and performing a positioning operation with respect to one or more of the wireless device, a base station in the wireless communication network, or the WLAN AP, at least in part based on the identifier of the WLAN AP.

In some embodiments, the method comprises selecting the WLAN AP over the network, or biasing a selection process towards the selection of the WLAN AP over the network, responsive to determining that the WLAN AP is known to the wireless device and/or that the wireless device has a security certificate for the WLAN AP. In other embodiments, the method comprises performing channel selection so as to avoid selecting a channel associated with the WLAN AP, if the identifier of the WLAN AP indicates that it is a hotspot AP or operator-affiliated AP.

Figure 9:
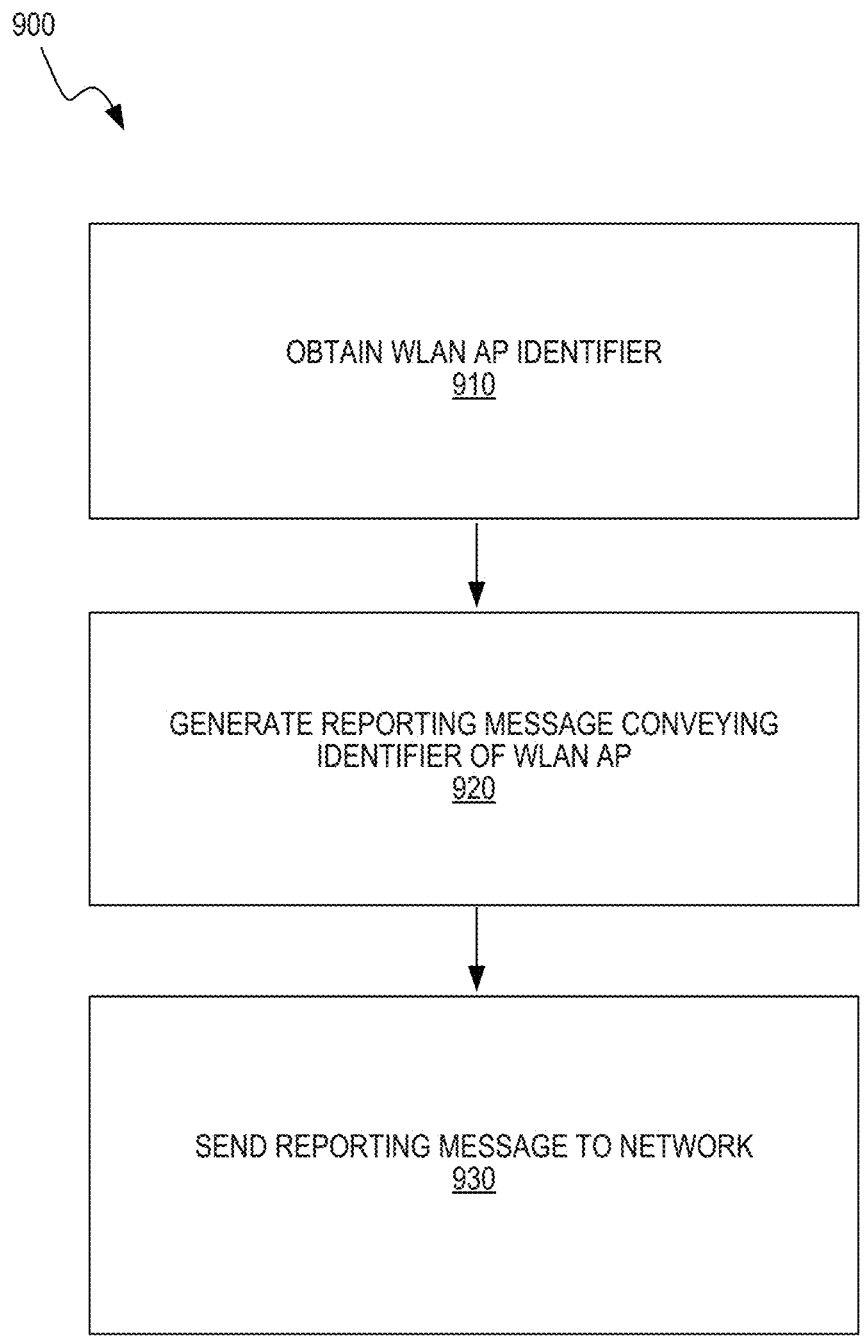
FIG. 9 is a process flow diagram illustrating an example method in a wireless device, according to the presently disclosed techniques.

FIG. 9 illustrates a complementary method 900, as implemented in a wireless device configured for operation in a wireless communication network that at least conditionally uses spectrum associated with WLAN use. As seen at block 910, the method comprises obtaining an identifier of the WLAN AP, based on receiving broadcasts or other signaling from the WLAN AP. As seen at block 920, the method further includes generating a reporting message that conveys the identifier of the WLAN AP. Finally, as shown at block 930, the method includes sending the reporting message to the network.

Figure 10:
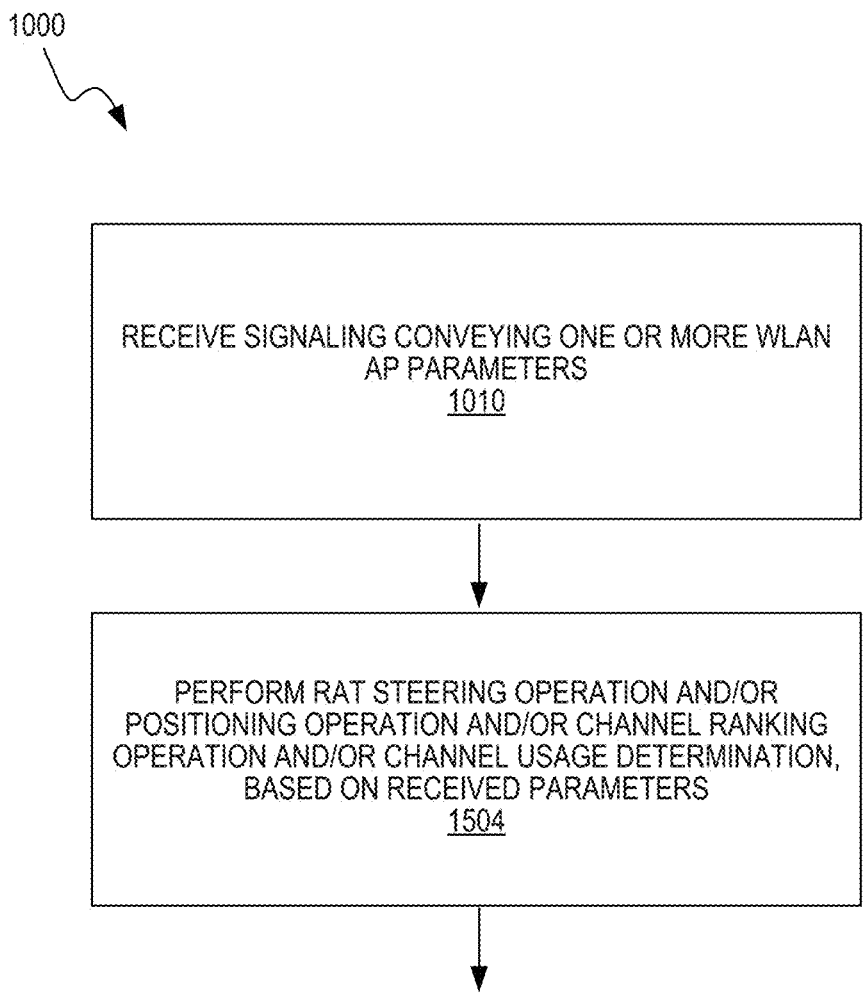
FIG. 10 is a process flow diagram illustrating another example method in a network node, according to the presently disclosed techniques.

FIG. 10 illustrates another method 1000, for implementation in a network node configured for operation in a wireless communication network that at least conditionally uses spectrum associated with WLAN use. As seen at block 1010, this method includes receiving signaling conveying one or more parameters of a WLAN AP operating in the spectrum. As shown at block 1020, the method further comprises performing any one or more of a radio-access technology (RAT) steering operation, a positioning operation, a channel ranking operation for the spectrum, and a channel usage determination for the spectrum, based on at least one of the received parameters. At least one of the received parameters comprises one or more of: an indicator of the version or versions of Wi-Fi used or supported by the WLAN AP; an indicator of whether the WLAN AP is a hotspot AP; an indicator of whether the WLAN AP is an infrastructure AP; an indicator or indicators of Wi-Fi beacon duration and/or data rate for the WLAN AP; an indicator of the Received Signal Strength of the Wi-Fi beacon from the WLAN AP, as measured by a wireless device reporting the one or more parameters; an indicator of transmission power of the WLAN AP; an indicator of whether the WLAN AP is known to the reporting wireless device; an indicator of whether the reporting wireless device has a certificate for the WLAN AP; an indicator or indicators of an organizational affiliation of the WLAN AP; and an indicator of an identifier of the WLAN AP, such as any one or more of the SSID, BSSID or HESSID of the WLAN AP.

In some embodiments, the method comprises selecting the WLAN AP over the network, or biasing a selection process towards the selection of the WLAN AP over the network, responsive to receiving an indicator that the WLAN AP is known to the wireless device and/or that the wireless device has a security certificate for the WLAN AP. In other embodiments, the method comprises performing channel selection so as to avoid selecting a channel associated with the WLAN AP, if the identifier of the WLAN AP indicates that it is a hotspot AP or operator-affiliated AP.

Figure 11:
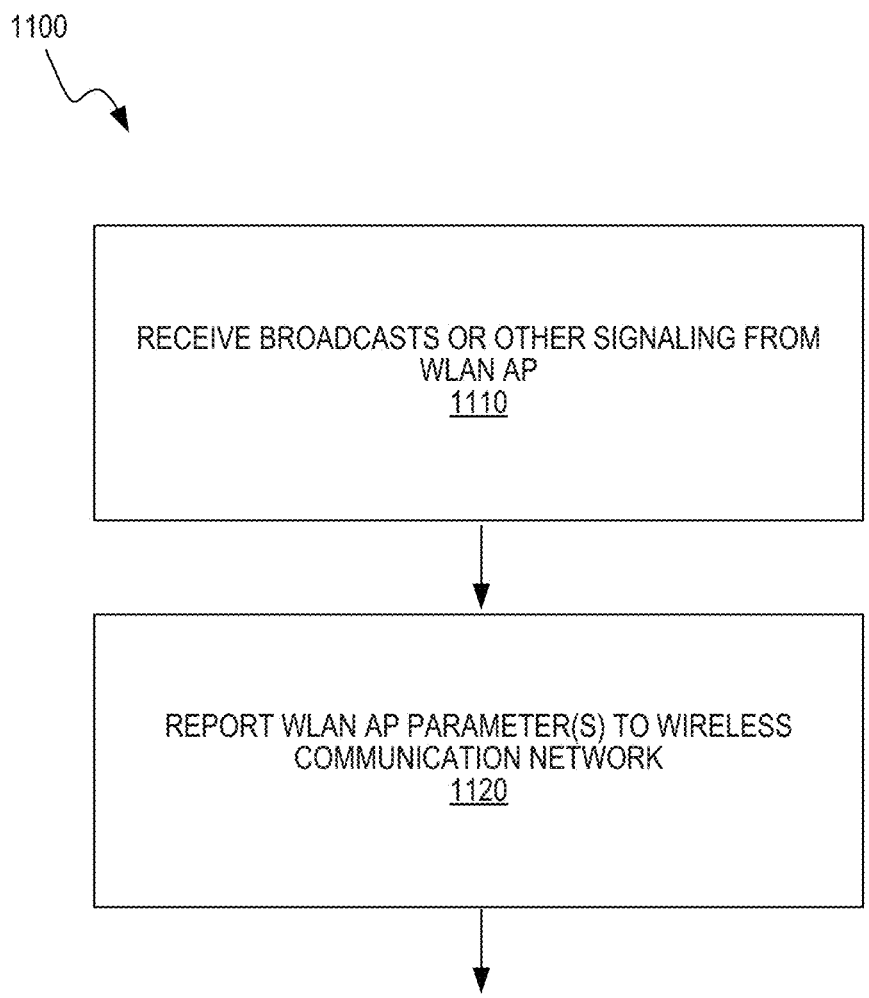
FIG. 11 is a process flow diagram illustrating another example method in a wireless device, according to the presently disclosed techniques.

FIG. 11 illustrates a method 1100, complementary to that shown in FIG. 10, for implementation in a wireless device configured for operation in a wireless communication network that at least conditionally uses spectrum associated with WLAN use. As shown at block 1110, the method comprises receiving broadcasts or other signaling from a WLAN AP operating in the spectrum. As shown at block 1120, the method further comprises reporting any one or more of the following parameters to the wireless communication network: an indicator of the version or versions of Wi-Fi used or supported by the WLAN AP; an indicator of whether the WLAN AP is a hotspot AP; an indicator of whether the WLAN AP is an infrastructure AP; an indicator or indicators of Wi-Fi beacon duration and/or data rate for the WLAN AP; an indicator of the Received Signal Strength of the Wi-Fi beacon from the WLAN AP, as measured by the wireless device; an indicator of transmission power of the WLAN AP; an indicator of whether the WLAN AP is known to the wireless device; an indicator of whether the reporting wireless device has a certificate for the WLAN AP; an indicator or indicators of an organizational affiliation of the WLAN AP; and an indicator of an identifier of the WLAN AP, such as any one or more of the SSID, BSSID or HESSID of the WLAN AP.

Figure 13:
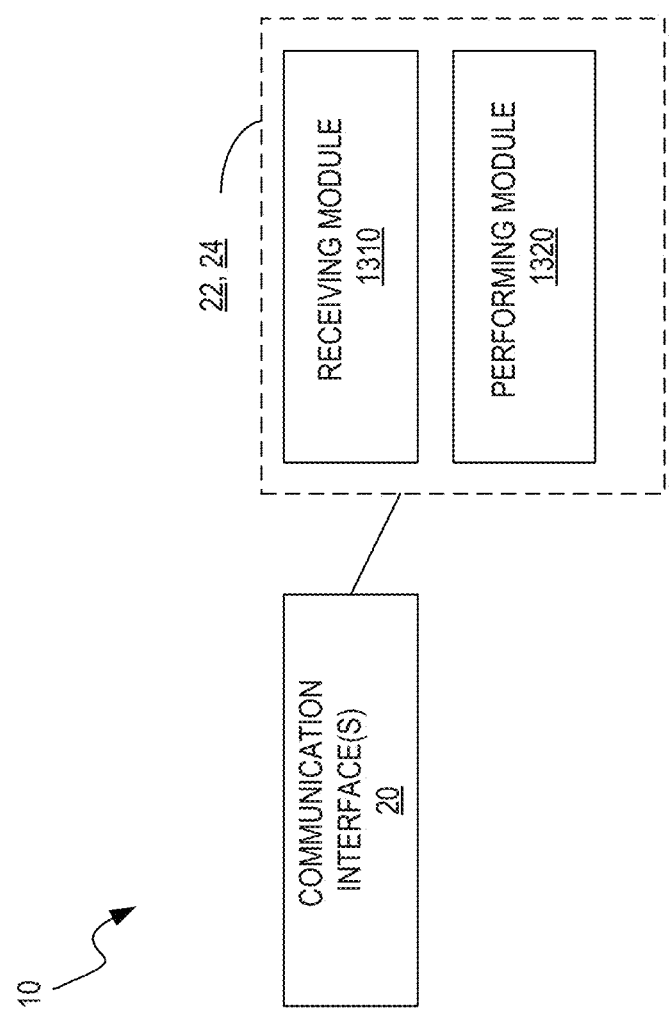
FIGS. 13, 14, 15, and 16 illustrate functional representations of network nodes and wireless devices according to the presently disclosed techniques and apparatuses.

FIG. 13 illustrates an example functional module or circuit architecture as may be implemented in a network node like that of network node 10 in FIG. 2, where the network node 10 is configured for operation in a wireless communication network that at least conditionally uses spectrum associated with Wireless Local Area Network, WLAN use. The illustrated embodiment at least functionally includes a receiving module 1310 for receiving signaling conveying an identifier of a Wireless Local Area Network Access Point (WLAN AP) operating in the spectrum, and further includes a performing module 1320 for performing any one or more of: determining a preference between serving the wireless device via the wireless communication network or via the WLAN AP, at least in part based on the identifier of the WLAN AP; performing channel ranking or channel selection with respect to use of the spectrum by the wireless communication network, at least in part based on the identifier of the WLAN AP; and performing a positioning operation with respect to one or more of the wireless device, a base station in the wireless communication network, or the WLAN AP, at least in part based on the identifier of the WLAN AP.

Figure 14:
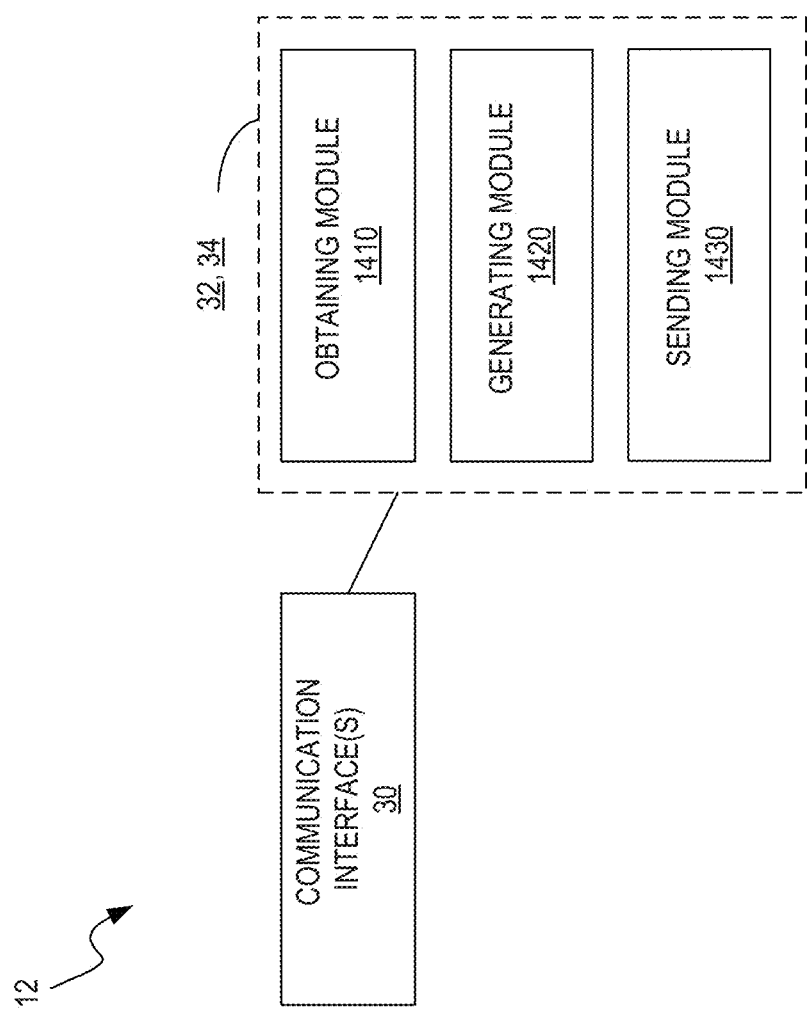

FIG. 14 illustrates an example functional module or circuit architecture as may be implemented in a wireless device like the wireless device 12 of FIG. 2, where the wireless device 12 is configured for operation in a wireless communication network that at least conditionally uses spectrum associated with WLAN use. The illustrated embodiment at least functionally includes an obtaining module 1410 for obtaining an identifier of the WLAN AP, based on receiving broadcasts or other signaling from the WLAN AP, and further includes a generating module 1420 for generating a reporting message that conveys the identifier of the WLAN AP. Finally, the embodiment includes a sending module 1430 for sending the reporting message to the network.

Figure 15:
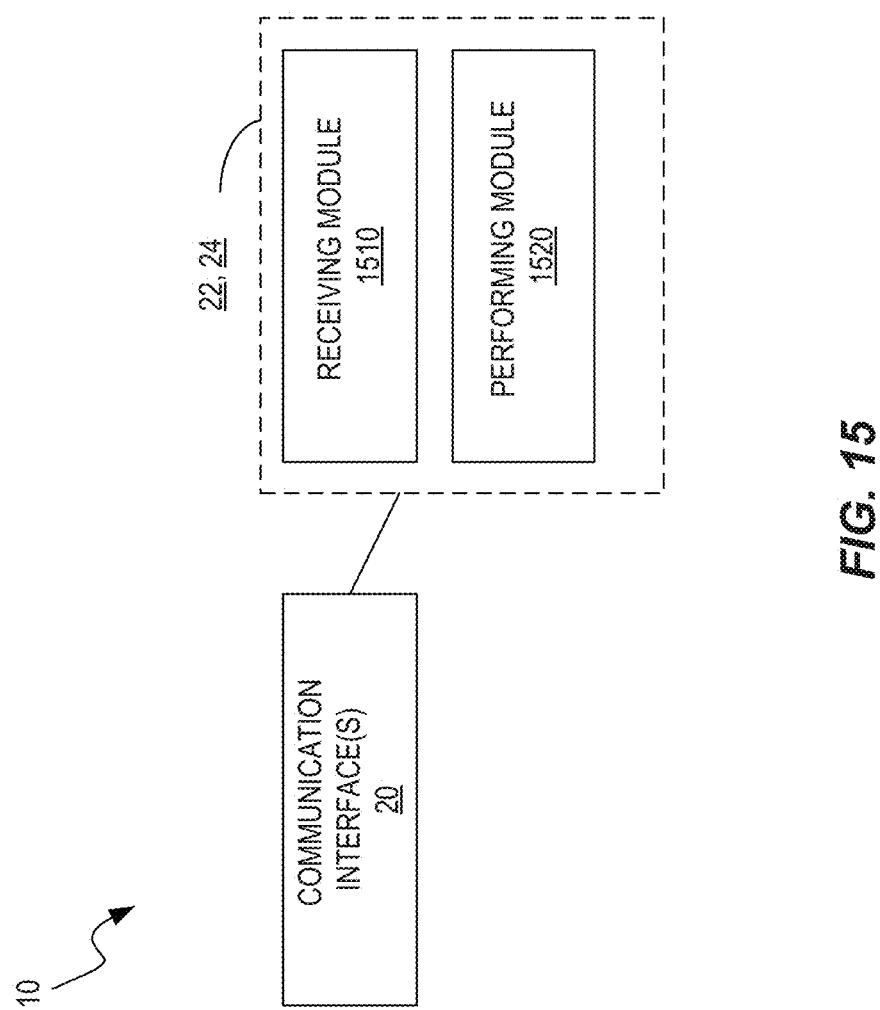

FIG. 15 illustrates another example functional module or circuit architecture as may be implemented in a network node like that of network node 10 in FIG. 2, where the network node 10 is configured for operation in a wireless communication network that at least conditionally uses spectrum associated with Wireless Local Area Network, WLAN use. The illustrated embodiment in FIG. 15 at least functionally includes a receiving module 1510 for receiving signaling conveying one or more parameters of a WLAN AP operating in the spectrum, and further comprises a performing module 1520 for performing any one or more of a radio-access technology (RAT) steering operation, a positioning operation, a channel ranking operation for the spectrum, and a channel usage determination for the spectrum, based on at least one of the received parameters. As discussed above, at least one of the received parameters comprises one or more of: an indicator of the version or versions of Wi-Fi used or supported by the WLAN AP; an indicator of whether the WLAN AP is a hotspot AP; an indicator of whether the WLAN AP is an infrastructure AP; an indicator or indicators of Wi-Fi beacon duration and/or data rate for the WLAN AP; an indicator of the Received Signal Strength of the Wi-Fi beacon from the WLAN AP, as measured by a wireless device reporting the one or more parameters; an indicator of transmission power of the WLAN AP; an indicator of whether the WLAN AP is known to the reporting wireless device; an indicator of whether the reporting wireless device has a certificate for the WLAN AP; an indicator or indicators of an organizational affiliation of the WLAN AP; and an indicator of an identifier of the WLAN AP, such as any one or more of the SSID, BSSID or HESSID of the WLAN AP.

Figure 16:
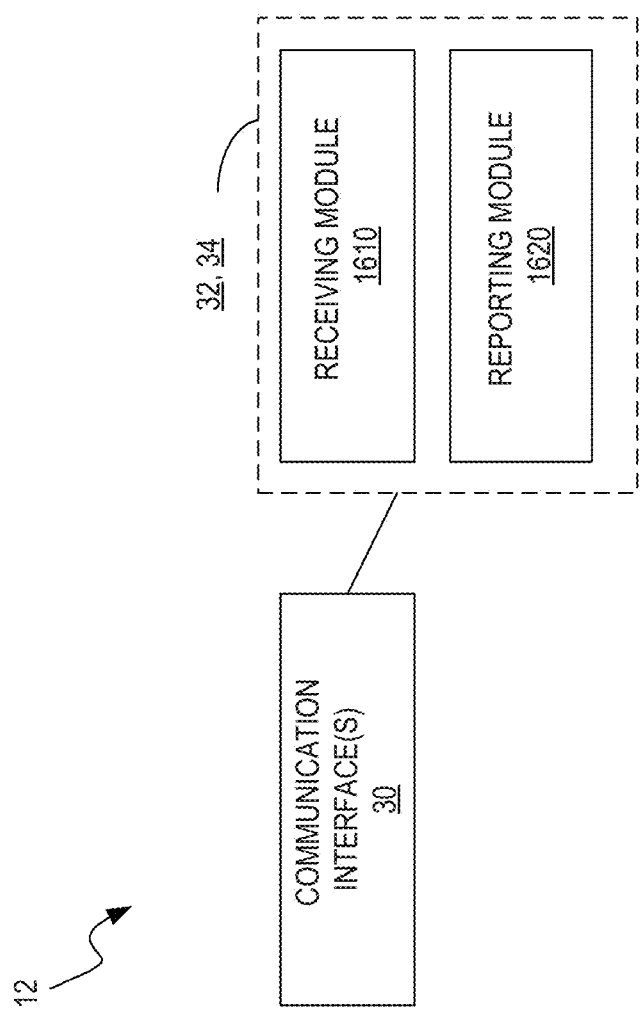

Finally, FIG. 16 illustrates an example functional module or circuit architecture as may be implemented in a wireless device like the wireless device 12 of FIG. 2, where the wireless device 12 is configured for operation in a wireless communication network that at least conditionally uses spectrum associated with WLAN use. The illustrated embodiment at least functionally includes a receiving module 1610 for receiving broadcasts or other signaling from a WLAN AP operating in the spectrum, and further includes a reporting module 1620 for reporting any one or more of the following parameters to the wireless communication network: an indicator of the version or versions of Wi-Fi used or supported by the WLAN AP; an indicator of whether the WLAN AP is a hotspot AP; an indicator of whether the WLAN AP is an infrastructure AP; an indicator or indicators of Wi-Fi beacon duration and/or data rate for the WLAN AP; an indicator of the Received Signal Strength of the Wi-Fi beacon from the WLAN AP, as measured by the wireless device; an indicator of transmission power of the WLAN AP; an indicator of whether the WLAN AP is known to the wireless device; an indicator of whether the reporting wireless device has a certificate for the WLAN AP; an indicator or indicators of an organizational affiliation of the WLAN AP; and an indicator of an identifier of the WLAN AP, such as any one or more of the SSID, BSSID or HESSID of the WLAN AP.

It will be appreciated that the methods described herein may be implemented as computer programs suitable for execution by one or more processing circuits of a network node or a wireless device. Thus, embodiments of the presently disclosed invention include computer program products comprising any of such computer programs, as well as computer-readable media carrying such computer program products. Those computer-readable media include, for example, non-transitory embodiments such as computer memories comprising such computer program products.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A network node configured for operation in a wireless communication network that at least conditionally uses spectrum associated with Wireless Local Area Network (WLAN) use, said network node comprising:
one or more communication interfaces configured to receive signaling conveying an identifier of a Wireless Local Area Network Access Point (WLAN AP) operating in the spectrum; and
processing circuitry that is operatively associated with the one or more communication interfaces and configured to
perform a positioning operation with respect to one or more of a wireless device served by the network node and a base station in the wireless communication network, at least in part based on the identifier of the WLAN AP.

2. The network node of claim 1, wherein the spectrum associated with WLAN use is unlicensed spectrum.

3. The network node of claim 1, wherein the processing circuitry is configured to select the WLAN AP over the network, or bias a selection process towards the selection of the WLAN AP over the network, responsive to determining that the WLAN AP is known to the wireless device and/or that the wireless device has a security certificate for the WLAN AP.

4. The network node of claim 1, wherein the processing circuitry is configured to perform channel selection so as to avoid selecting a channel associated with the WLAN AP, if the identifier of the WLAN AP indicates that it is a hotspot AP or operator-affiliated AP.

5. A network node configured for operation in a wireless communication network that at least conditionally uses spectrum associated with Wireless Local Area Network (WLAN) use, said network node comprising:
one or more communication interfaces configured to receive signaling conveying one or more parameters of a Wireless Local Area Network Access Point (WLAN AP) operating in the spectrum; and
processing circuitry that is operatively associated with the one or more communication interfaces and configured to perform any one or more of a radio-access technology (RAT) steering operation, a positioning operation, a channel ranking operation for the spectrum, and a channel usage determination for the spectrum, based on at least one of the following parameters, as one of said one or more parameters received via the communication interface(s):
an indicator or indicators of Wi-Fi beacon duration and/or data rate for the WLAN AP; and
an indicator of the Received Signal Strength of the Wi-Fi beacon from the WLAN AP, as measured by a wireless device reporting the one or more parameters.

6. The network node of claim 5, wherein the spectrum associated with WLAN use is unlicensed spectrum.

7. The network node of claim 5, wherein the processing circuitry is configured to select the WLAN AP over the network, or bias a selection process towards the selection of the WLAN AP over the network, responsive to determining that the WLAN AP is known to the wireless device and/or that the wireless device has a security certificate for the WLAN AP.

8. The network node of claim 5, wherein the processing circuitry is configured to perform channel selection so as to avoid selecting a channel associated with the WLAN AP, if the identifier of the WLAN AP indicates that it is a hotspot AP or operator-affiliated AP.

9. A wireless device configured for operation in a wireless communication network that at least conditionally uses spectrum associated with Wireless Local Area Network (WLAN) use, said wireless device comprising:
one or more communication interfaces configured to communicate with the network and with a WLAN AP operating in the spectrum; and
processing circuitry that is operatively associated with the one or more communication interfaces and configured to report any one or more of the following parameters to the network:
an indicator or indicators of Wi-Fi beacon duration and/or data rate for the WLAN AP; and an indicator of the Received Signal Strength of the Wi-Fi beacon from the WLAN AP, as measured by the wireless device.

10. The wireless device of claim 9, wherein the spectrum associated with WLAN use is unlicensed spectrum.

11. A method, in a network node configured for operation in a wireless communication network that at least conditionally uses spectrum associated with Wireless Local Area Network (WLAN) use, said method comprising:
receiving signaling conveying an identifier of a Wireless Local Area Network Access Point (WLAN AP) operating in the spectrum; and
performing a positioning operation with respect to one or more of a wireless device served by the network node and base station in the wireless communication network, at least in part based on the identifier of the WLAN AP.

12. The method of claim 11, wherein the method comprises selecting the WLAN AP over the network, or biasing a selection process towards the selection of the WLAN AP over the network, responsive to determining that the WLAN AP is known to the wireless device and/or that the wireless device has a security certificate for the WLAN AP.

13. The method of claim 11, wherein the method comprises performing channel selection so as to avoid selecting a channel associated with the WLAN AP, if the identifier of the WLAN AP indicates that it is a hotspot AP or operator-affiliated AP.

14. A method in a network node configured for operation in a wireless communication network that at least conditionally uses spectrum associated with Wireless Local Area Network (WLAN) use, said method comprising:
receiving signaling conveying one or more parameters of a Wireless Local Area Network Access Point (WLAN AP) operating in the spectrum; and
performing any one or more of a radio-access technology (RAT) steering operation, a positioning operation, a channel ranking operation for the spectrum, and a channel usage determination for the spectrum, based on at least one of the received parameters, wherein the at least one of the received parameters comprises one or more of:
an indicator or indicators of Wi-Fi beacon duration and/or data rate for the WLAN AP; and
an indicator of the Received Signal Strength of the Wi-Fi beacon from the WLAN AP, as measured by a wireless device reporting the one or more parameters.

15. The method of claim 14, further comprising selecting the WLAN AP over the network, or biasing a selection process towards the selection of the WLAN AP over the network, responsive to receiving an indicator that the WLAN AP is known to the wireless device and/or that the wireless device has a security certificate for the WLAN AP.

16. The network node of claim 14, wherein the method comprises performing channel selection so as to avoid selecting a channel associated with the WLAN AP, if the identifier of the WLAN AP indicates that it is a hotspot AP or operator-affiliated AP.

17. A method in a wireless device configured for operation in a wireless communication network that at least conditionally uses spectrum associated with Wireless Local Area Network (WLAN) use, said method comprising:
receiving broadcasts or other signaling from a WLAN AP operating in the spectrum; and
reporting any one or more of the following parameters to the wireless communication network:
an indicator or indicators of Wi-Fi beacon duration and/or data rate for the WLAN AP; and
an indicator of the Received Signal Strength of the Wi-Fi beacon from the WLAN AP, as measured by the wireless device.

* * * * *

UNITED STATES PATENT AND TRADEMARK OFFICE
CERTIFICATE OF CORRECTION

PATENT NO. : 10,506,484 B2
APPLICATION NO. : 15/024764
DATED : December 10, 2019
INVENTOR(S) : Richards et al.

Page 1 of 1

It is certified that error appears in the above-identified patent and that said Letters Patent is hereby corrected as shown below:

In the Specification

Column 7, Line 20, delete "WLANs, 50." and insert -- WLANs, 70. --, therefor.

Column 7, Line 57, delete "more of" and insert -- more of: --, therefor.

Column 9, Line 12, delete "block 615." and insert -- block 6015. --, therefor.

Column 9, Line 15, delete "block 615." and insert -- block 6015. --, therefor.

Signed and Sealed this
Twenty-sixth Day of May, 2020

Andrei Iancu
*Director of the United States Patent and Trademark Office*